(12) United States Patent
Stadtfeld et al.

(10) Patent No.: US 10,391,569 B2
(45) Date of Patent: Aug. 27, 2019

(54) LOCK SPRING AND CUTTING TOOL HAVING A LOCK SPRING

(71) Applicant: THE GLEASON WORKS, Rochester, NY (US)

(72) Inventors: Herman J. Stadtfeld, Webster, NY (US); Anthony J. Norselli, Hilton, NY (US); Mark J. Boch, East Rochester, NY (US); William G. Landry, Canandaigua, NY (US)

(73) Assignee: THE GLEASON WORKS, Rochester, NY (US)

( * ) Notice: Subject to any disclaimer, the term of this patent is extended or adjusted under 35 U.S.C. 154(b) by 36 days.

(21) Appl. No.: 15/544,931

(22) PCT Filed: Feb. 12, 2016

(86) PCT No.: PCT/US2016/017704
§ 371 (c)(1),
(2) Date: Jul. 20, 2017

(87) PCT Pub. No.: WO2016/130891
PCT Pub. Date: Aug. 18, 2016

(65) Prior Publication Data
US 2018/0036814 A1    Feb. 8, 2018

Related U.S. Application Data

(60) Provisional application No. 62/115,827, filed on Feb. 13, 2015.

(51) Int. Cl.
*B23F 21/22*    (2006.01)
*B23F 21/12*    (2006.01)
(Continued)

(52) U.S. Cl.
CPC .......... *B23F 21/226* (2013.01); *B23C 5/2472* (2013.01); *B23C 5/2489* (2013.01);
(Continued)

(58) Field of Classification Search
CPC .... B23F 21/226; B23F 21/128; B23C 5/2472; B23C 5/2489; B23C 2260/84; B23C 5/08; F16B 39/24
See application file for complete search history.

(56) References Cited

U.S. PATENT DOCUMENTS 2,669,890 A    2/1954  Tao
3,673,655 A *  7/1972  Eydieux ................ B23F 21/226
                                                    407/22
(Continued)

FOREIGN PATENT DOCUMENTS

DE    2163842 A1    6/1973
DE    19802497 A1 *  7/1998  ............ F16B 41/002
(Continued)

OTHER PUBLICATIONS

English translation of DE19802497 A1, Jul. 1998 (Year: 1998).*
International Search Report and Written Opinion for PCT/US2016/017704, ISA/EPO, dated May 24, 2016, 12 pages.

*Primary Examiner* — Alan Snyder
(74) *Attorney, Agent, or Firm* — Robert L. McDowell

(57) ABSTRACT

A cutter head (4, 6) having a lock spring (30) utilized with an adjustment screw (16) for preventing the adjustment screw from loosening during machining. Once positioned by turning the adjustment screw, a cutting blade (8) will not change position in a mounting slot (10) due to a loosening adjustment screw.

8 Claims, 3 Drawing Sheets

(51) Int. Cl.
*B23C 5/24* (2006.01)
*F16B 39/24* (2006.01)
(52) U.S. Cl.
CPC ...... *B23F 21/128* (2013.01); *B23C 2210/165* (2013.01); *B23C 2260/84* (2013.01); *F16B 39/24* (2013.01)

(56) References Cited

U.S. PATENT DOCUMENTS

| | | | | |
|---|---|---|---|---|
| 3,760,476 A | * | 9/1973 | Kotthaus | ............... B23C 5/2239 407/21 |
| 4,064,921 A | | 12/1977 | Kose | |
| 4,303,362 A | | 12/1981 | Lockhart | |
| 2009/0175693 A1 | * | 7/2009 | Jansson | ............... B23B 27/1685 407/37 |

FOREIGN PATENT DOCUMENTS

| | | |
|---|---|---|
| DE | 19802497 A1 | 7/1998 |
| EP | 2659999 A2 | 11/2013 |
| GB | 355096 A | 8/1931 |
| WO | 2014-093411 A1 | 6/2014 |

* cited by examiner

LOCK SPRING AND CUTTING TOOL HAVING A LOCK SPRING

This applications claims the benefit of U.S. Provisional Patent Application No. 62/115,827 filed Feb. 13, 2015, the entire disclosure of which is hereby incorporated by reference.

FIELD OF THE INVENTION

The invention is directed to gear cutting tools and in particular to a lock spring for maintaining the position of an adjustment screw in a cutter head.

BACKGROUND OF THE INVENTION

Cutter heads for gear manufacture are generally disc-shaped and rotatable about a cutter head axis. A cutter head comprises a first side and a second side, one or more cutting blade positioning slots arranged in the cutter head with each of the blade positioning slots extending between the first and second sides. One or more stick-type (i.e. bar-type) cutting blades are positioned and clamped, usually via one or more clamp screws and clamp blocks, in each of the blade positioning slots.

Radial blade adjustment in stick blade cutter heads requires at least one adjustment screw adjacent to a main clamp screw. Inward movement of the adjustment screw causes a cutting blade to slide or roll in the cutter head whereby the radial location of the tip and cutting edge of the cutting blade is repositioned. Such radial repositioning assures the same radial position of all cutting edges (outside blades and/or inside blades) within a certain tolerance. For example, see WO 2014/074495 or WO 2014/093411.

Adjustment screws of radially adjustable cutters usually have fine treads, as opposed to the standard threads of a clamp screw, in order support the precise radial adjustment of the cutting blades. The torque on adjustment screws may vary between 2 and 20 Nm. In cases of low torque on the adjustment screws, it has been experienced that during the cutting process, especially after cutting a high quantity of parts, the adjustment screw may turn itself out which is believed to be caused by cutter vibration. Movement of an adjustment screw will change the radial position of the respective cutting blade thereby positioning the cutting blade radially out-of-line with the remaining blades in a cutter head.

If an adjustment screw loosens during the cutting of a quantity of parts, the advantage of radial blade truing is diminished or even eliminated.

SUMMARY OF THE INVENTION

The invention is directed to a lock spring utilized with an adjustment screw for preventing the adjustment screw from loosening during machining.

DETAILED DESCRIPTION OF THE PREFERRED EMBODIMENT

Figure 1:
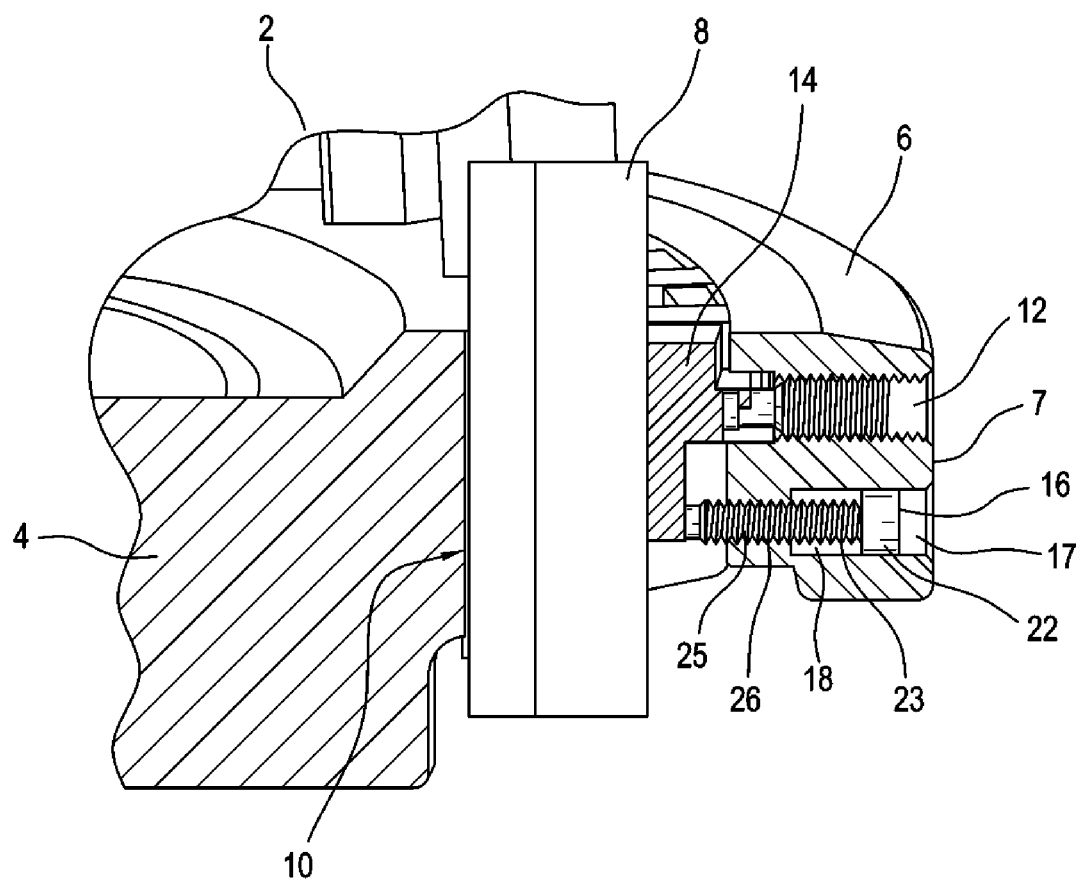
FIG. 1 shows a cross-sectional view of a gear cutting tool having an upper clamp screw and a lower adjustment screw.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers. Although references may be made below to directions such as upper, lower, upward, downward, rearward, bottom, top, front, rear, etc., in describing the drawings, there references are made relative to the drawings (as normally viewed) for convenience. These directions are not intended to be taken literally or limit the present invention in any form.

The use of "including", "having" and "comprising" and variations thereof herein is meant to encompass the items listed thereafter and equivalents thereof as well as additional items.

FIG. 1 shows a cross-sectional view of a gear cutting tool 2 comprising a cutter body 4, outer clamping ring 6 and a cutting blade 8 positioned in a mounting slot 10 located in cutter body 4. Cutter body 4 and clamping ring 6 collectively form a cutter head which is rotatable about an axis of rotation (not shown) as is known to the artisan. Extending inwardly from the periphery 7 of the cutter head to slot 10 is an upper screw 12 which is a clamp screw that is in contact with a clamp block 14 in order to hold the blade 8 in position in the slot 10. Also extending inwardly from the periphery 7 of the cutter head to slot 10 is a lower screw 16 which is an adjustment screw that contacts the lower end of the clamp block 14.

Adjustment screw 16 includes a head 22 and a shaft 23 wherein at least a portion of the shaft comprises threads 25. The adjustment screw 16 is movable inwardly into slot 10 and outwardly away from slot 10 via a cylindrical passageway 17 (i.e. adjustment screw hole 17) and tapped section 26 in the cutter head that together define an opening extending from the periphery 7 of the cutter head to the slot 10. The threads 25 of adjustment screw 16 are engaged with the complementary threads of tapped section 26. Cylindrical passageway 17 comprises a first end open to the periphery 7 of the cutter head and extends inwardly to a second end at shoulder 24 where the cylindrical passageway is open to and communicates with the inner tapped section 26. A space 18 is located between the inner shoulder 20 of the screw head 22 and the shoulder 24 at the beginning of the tapped section 26 in the cutter head. The space 18 preferably has the shape of a hollow cylinder.

Adjustment screws are commonly Allan head screws although the invention is not limited thereto. The screw 16, screw hole 17 and tapped section 26 are generally designed such that between the back surface 20 of the screw head 22 and the beginning 24 of the tapped section 26, an empty space (i.e. 18) with the shape of hollow cylinder is formed as shown in FIG. 1. This space 18 may be utilized to place a resilient member, such as a spring 30 (FIG. 2), preferably with some clearance at the outer diameter to allow for any expansion. Spring 30 is preferably a coil spring but other types of springs, such as Belleville or disc springs, etc. may be utilized. The spring 30 which is placed in the described space 18, around screw shaft 23, has to be pre-compressed, such that a force, preferably between 20 to 100N, is applied to the axial seating inner shoulder (i.e. back surface 20) of the screw head 22 while the screw is in an initial position where it does not contact the clamp block 14. If the spring 30 is wound with a left hand lead in the case where the adjustment screw 16 has right hand threads, then a rotation inward (in right hand direction) can be performed with low or moderate resistance.

Due to the friction between the shoulder 20 of the screw and the spring 30 as well as between the spring and the beginning 24 of the threads in the cutter head, a rotation of the adjustment screw outwards will result in the spring trying to unwind. Unwinding a helical spring will extend the length of the spring. If the spring 30 is trapped in a confined space (i.e. 18), unwinding the spring will increase the axial force which the spring applied to the shoulder of the adjustment screw. This force increase is opposed by the fact that the adjustment screw de-compresses the spring while it is turned out. For example, an adjustment screw spring may have an outer diameter of 8 mm and its length may be pre-compressed by an amount between 2 and 4 mm. The axial movement of the adjustment screw during the truing is in the vicinity of 0.2 mm or less, which makes the effect of de-compressing the spring in case of an outward rotation of the adjustment screw negligible.

Figure 2:
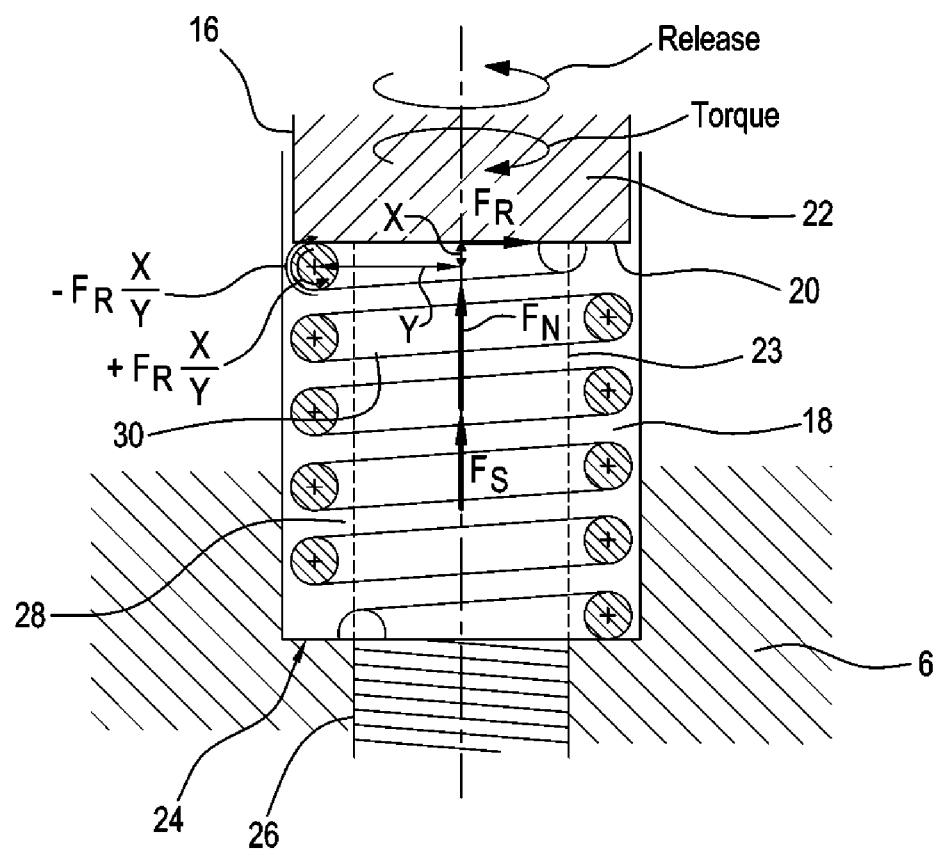
FIG. 2 illustrates a cross-section of a lock spring for an adjustment screw.

FIG. 2 shows a cross section of a lock spring 30, the adjustment screw 16 and a portion of the cutter head. Only the head 22 of the adjustment screw 16 without the threaded part is shown so as to provide more clarity for the explanation of the force diagram. Dashed lines represent the portion of the adjustment screw that passes through the space 18 and lock spring 30. The lock spring 30 is compressed between the screw head shoulder 20 and the shoulder 24 of cutter head where the threaded portion 26 begins. The spring compression force is Fs. The friction force is calculated by the initial spring compression force Fs and the additionally created force component $+/-F_R \cdot X/Y$ which only occurs in case of a screw rotation. The friction force times the arm X creates a moment around the spring coil (to the left in FIG. 2). This moment divided by the arm Y results in the additional force component, which superimposed with Fs will result in $F_N$. The effect of friction increase or reduction is used for achieving a precise adjustment (clockwise rotation) of the adjustment screw with a lowered torque and a prevention of screw loosening (i.e. counterclockwise screw rotation) in case of vibration etc.

FIG. 2 illustrates the principle of lock force amplification in case of releasing the adjustment screw and of lock force reduction in case of turning the adjustment screw in. The relationship between the shoulder friction and friction force is shown with the following formulae relationships. The friction force is directly proportional to the friction torque, which is felt during the rotation of the adjustment screw.

$$\text{Release: } F_R = F_S \cdot \mu + F_R \frac{x}{y} \cdot \mu \rightarrow F_R \left(1 - \frac{x}{y} \cdot \mu\right) = F_S \cdot \mu \quad (1)$$

$$\text{or: } F_R = \frac{F_S \cdot \mu}{\left(1 - \frac{x}{y} \cdot \mu\right)} \quad (2)$$

$$\text{Turn in: } F_R = F_S \cdot \mu - F_R \frac{x}{y} \cdot \mu \rightarrow F_R \left(1 + \frac{x}{y} \cdot \mu\right) = F_S \cdot \mu \quad (3)$$

$$\text{or: } F_R = \frac{F_S \cdot \mu}{\left(1 + \frac{x}{y} \cdot \mu\right)} \quad (4)$$

Where: $F_R$ = Friction Force
$F_S$ = Spring Force
$x$ = Vertical lever distance
$y$ = Horizontal lever distance
$\mu$ = Friction Factor An example for the vertical (x) and horizontal (y) lever distances, given below, and a friction factor of 0.3 shows the magnitude of friction force increase and friction force reduction:

$$\text{if } \frac{x}{y} = \frac{1}{5} \text{ and } \mu = 0.3$$

then in case of Release: $F_R = 0.32 F_S$ and in the case of Turning In: $F_R = 0.28 F_S$ FIG. 3 shows the adjustment screw 16 (lower screw) with the compressed spring 30 in the space 18 (FIG. 2) formed by a counter bore slightly larger than the outer diameter of the screw head 22 and the upper threaded or un-threaded section (dashed lines 28 in FIG. 2) of the adjustment screw.

Figure 3:
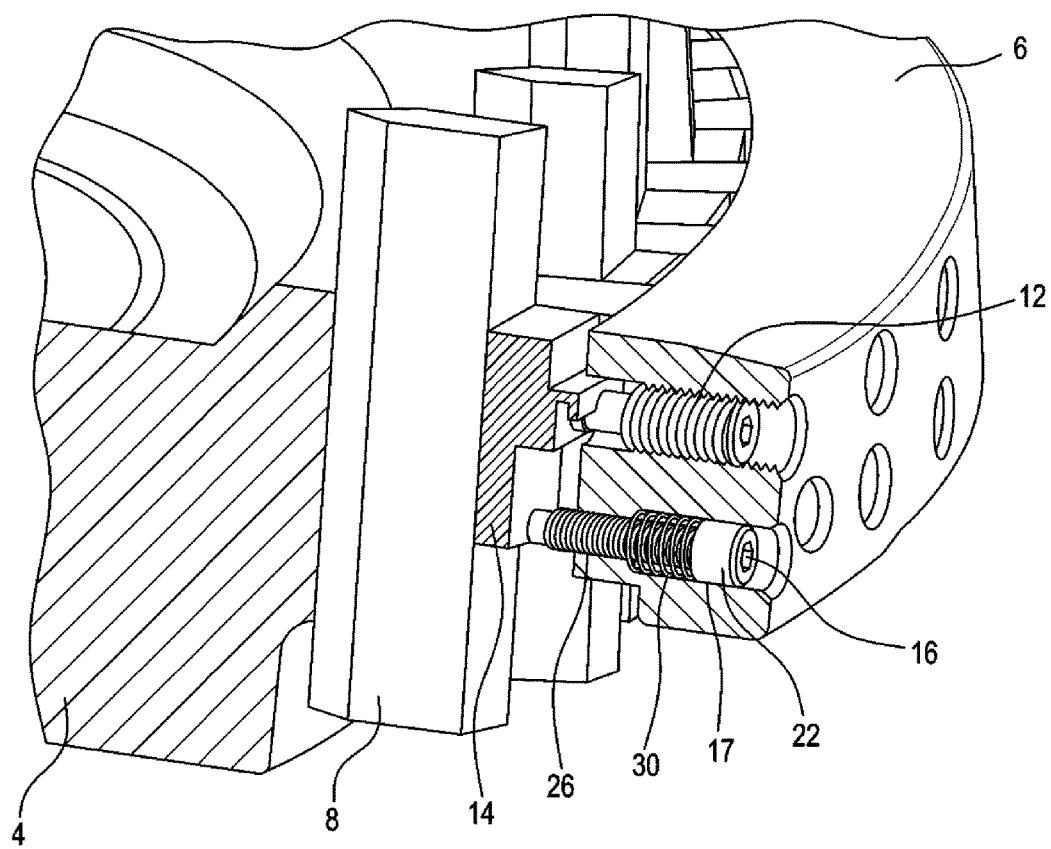
FIG. 3 shows cross-sectional view of a gear cutting tool having an adjustment screw and lock spring.

The friction between an adjustment screw 16 and a spring 30 as shown in FIG. 3 will allow an adjustment screw to be turned in (clockwise) with a firm resistance. In case of cutting vibrations during the cutting of several hundreds of parts, the adjustment screws are prevented from turning out (counterclockwise) and therefore loosening because of the increase of normal force between the end of the spring and the adjustment screw shoulder as shown in FIG. 2. The normal force multiplied by the friction factor between spring and adjustment screw shoulder and multiplied by the mean radius of the spring results in a resistance torque which prevents the adjustment screw from loosening. The resistance torque is higher while the adjustment screw is rotated counterclockwise (i.e. withdrawing the adjustment screw) and lower during a clockwise rotation (i.e. advancing the adjustment screw).

While the invention has been discussed and illustrated with a spring wound with a left hand lead and an adjustment screw having right hand threads, the opposite arrangement is likewise contemplated as are arrangements where the direction of spring lead and the adjustment screw "hand" of thread are the same.

Although the adjustment screw of the invention is shown located below a clamp screw, the adjustment screw may be located above a clamp screw depending on the geometry of a particular cutter body. Additionally, while the invention has been discussed and illustrated with respect to adjustment screws, the lock spring may be applied to any type of screw in any situation where loosening of the screw during processing is noted.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A cutter head portion of a rotatable gear cutting tool, said cutter head being disc-shaped and having a periphery, said cutter head comprising a plurality of cutting blade mounting slots and at least one adjustment screw, said at least one adjustment screw being operable to advance inward into at least one of said cutting blade mounting slots and to withdraw in a direction opposite to the advance inward movement, said at least one adjustment screw comprising a head portion and a shaft portion wherein at least a part of said shaft portion comprises threads, said at least one adjustment screw being located in an opening in said cutter head, said opening extending from said periphery to said at least one cutting blade mounting slot, an inner portion of said opening being threaded and in threaded engagement with the threads of said shaft portion, a spring located between said inner portion of said opening and a back surface of said head portion of said at least one adjustment screw, said spring being in contact with said back surface, said cutter head portion further comprising at least one clamp screw and at least one clamp block, said at least one clamp block being positioned in at least one of said cutting blade mounting slots and being operable to clamp a cutting blade in position in at least one of said cutting blade mounting slots, wherein at least one clamp screw and at least one adjustment screw contact said at least one clamp block in said at least one of said cutting blade mounting slots.

2. The cutter head of claim 1 wherein said spring is located positioned about said shaft of said at least one adjustment screw.

3. The cutter head of claim 1 wherein said spring is a coil spring.

4. The cutter head of claim 1 wherein said spring is pre-compressed.

5. The cutter head of claim 1 wherein said at least one adjustment screw is advanced by rotating said screw at a first resistance torque and is withdrawn by rotating in an opposite direction at a second resistance torque, wherein said second resistance torque is greater than said first resistance torque.

6. The cutter head of claim 3 wherein said adjustment screw comprises right-hand threads and said spring is wound with a left-hand lead.

7. The cutter head of claim 3 wherein said adjustment screw comprises left-hand threads and said spring is wound with a right-hand lead.

8. The cutter head of claim 1 wherein an area in the shape of a hollow cylinder is located between said inner portion of said opening and said head portion of said at least one adjustment screw and wherein said spring is located in said area.

* * * * *